United States Patent Office.

WILLIAM HENRY BALMAIN, OF ST. HELENS, GREAT BRITAIN.

Letters Patent No. 102,206, dated April 26, 1870.

IMPROVED MODE OF STORING AND TRANSPORTING OIL OF VITRIOL.

The Schedule referred to in these Letters Patent and making part of the same.

I, WILLIAM HENRY BALMAIN, of St. Helens, in the county of Lancaster, the Kingdom of Great Britain and Ireland, have invented an Improvement in Storing and Transporting Vitriol, of which the following is a specification.

Nature and Object of my Invention.

My invention consists in storing or transporting vitriol of a certain strength and purity in closed vessels of iron, the strength and purity of the vitriol being such that it will not have a corrosive effect on that metal.

General Description.

Heretofore vitriol has been stored and transported in carboys, that is, in large glass bottles protected with wicker-work or by packed boxes, through the top of which the necks of the bottles project.

More or less inconvenience is experienced in thus storing and transporting vitriol, owing partly to the large space occupied by the packages and partly to the frequent fracture of the glass vessels.

I have discovered the fact that if vitriol be concentrated to a given strength it will have no corrosive action on iron and may be stored or transported in iron vessels with perfect safety and much more economy than in ordinary carboys.

Two things are necessary in carrying out my invention:

First, the vitriol must be of a certain strength; I prefer to concentrate it up to 150° or 170° Twaddell, but if it be as low as 130° it may be stored or transported in iron vessels.

Second, the surface of the vitriol must not be freely exposed to air, as in that case a thin film of weak vitriol might form on the surface, and it is this weak vitriol which has the most destructive effect on the iron; at the same time, however, the vitriol may be exposed to such small portions of air as may be contained in the vessel when the latter is partially filled, this air, however, being effectually cut off from the external air.

It is also necessary that the vitriol, as well as being of the desired strength, shall be free from such impurities as may have an injurious effect on the iron.

When emptied, the vessel should be immediately washed thoroughly, and finally rinsed with a solution of soda-ash or milk of lime or other alkali.

Claim.

The storing or transporting of vitriol of the strength and purity herein described, in iron vessels.

In testimony whereof I have signed my name to this specification in the presence of two subscribing witnesses.

WILLIAM HENRY BALMAIN.

Witnesses:
P. WILLIAMSON DONNVILLE,
SAM. BRIGHOUSE.